May 29, 1934.  L. C. COLE  1,960,896
MACHINE TOOL
Filed Feb. 20, 1933  4 Sheets-Sheet 1
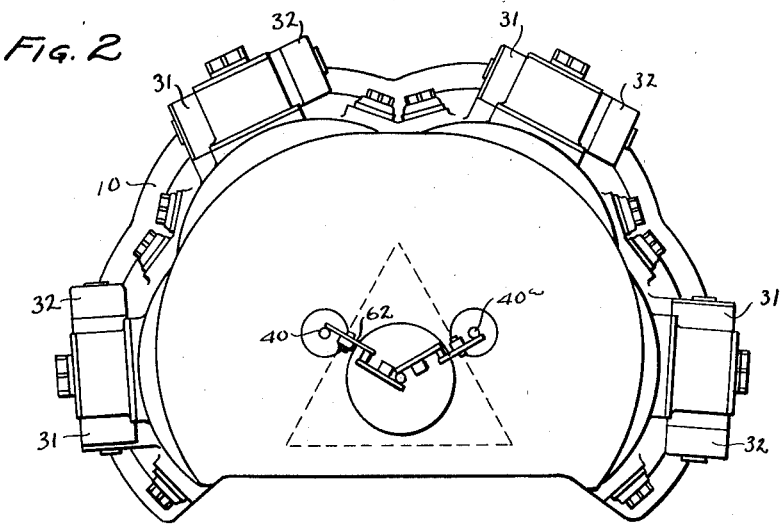
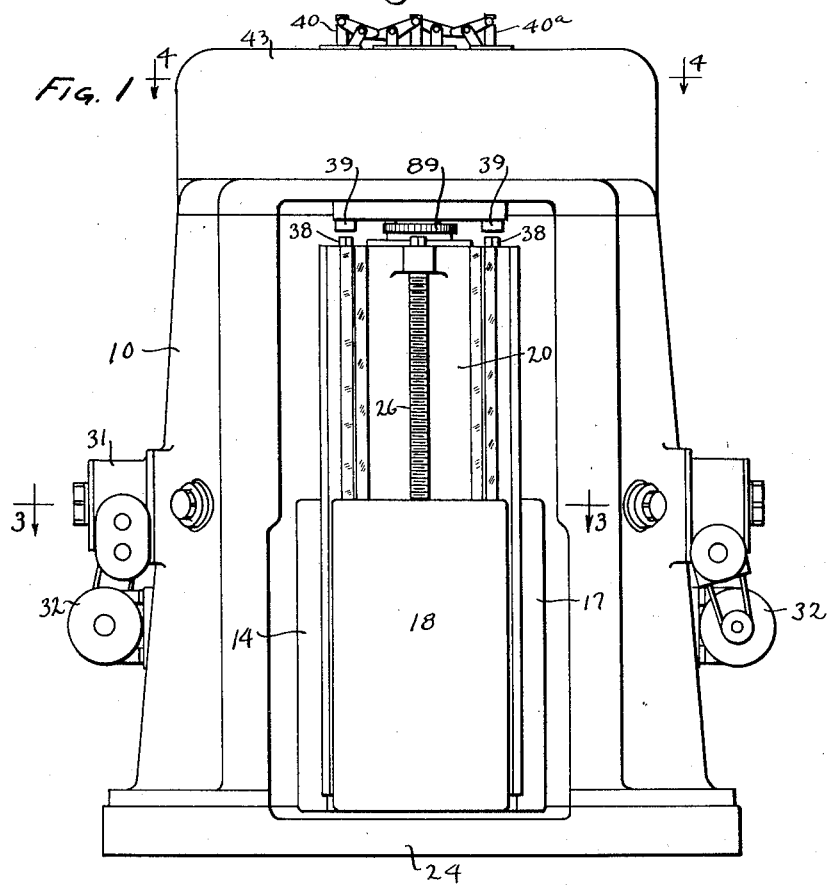
Inventor
Lyndon C. Cole
By Maréchal & Noe
Attorney

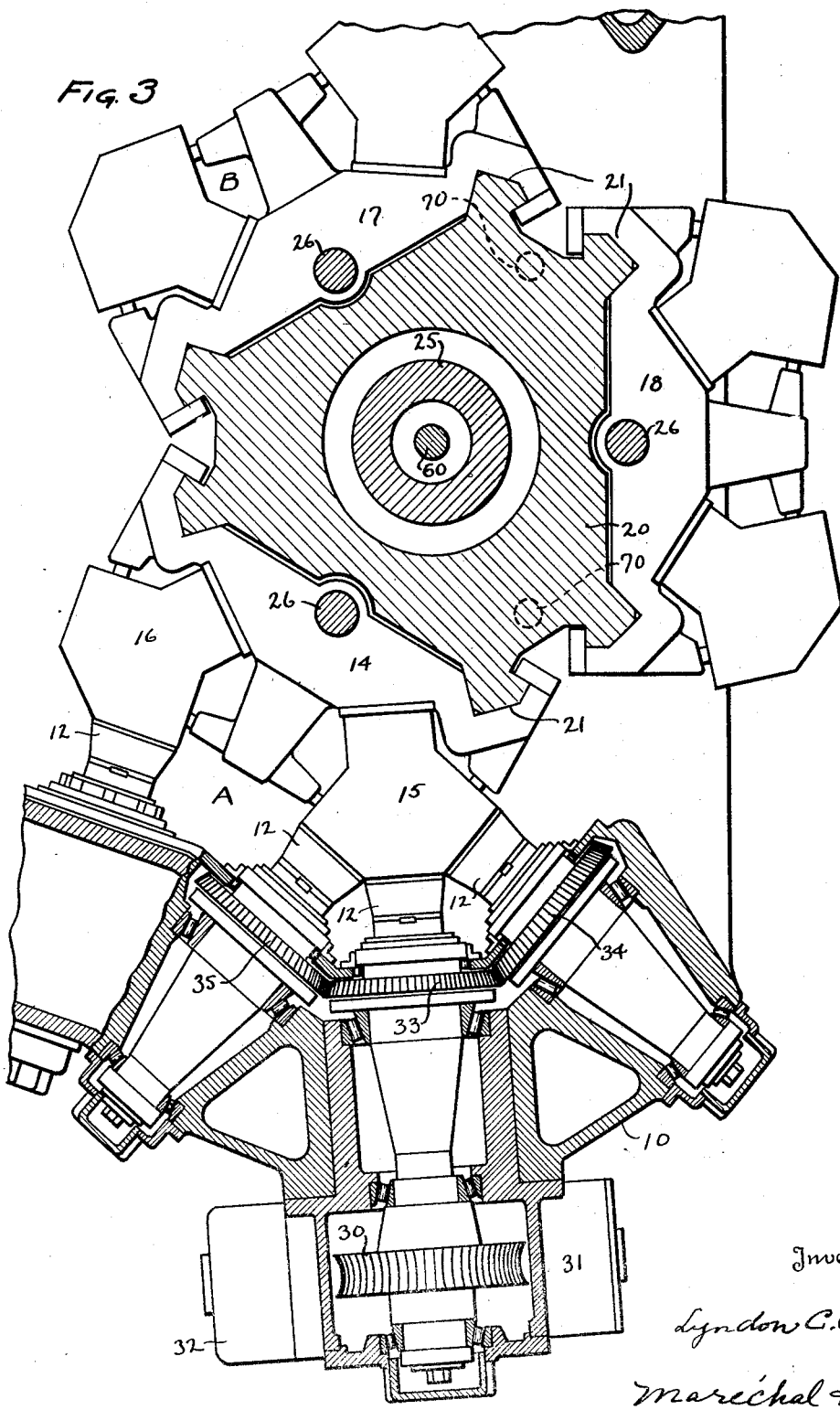

May 29, 1934.  L. C. COLE  1,960,896
MACHINE TOOL
Filed Feb. 20, 1933  4 Sheets-Sheet 3
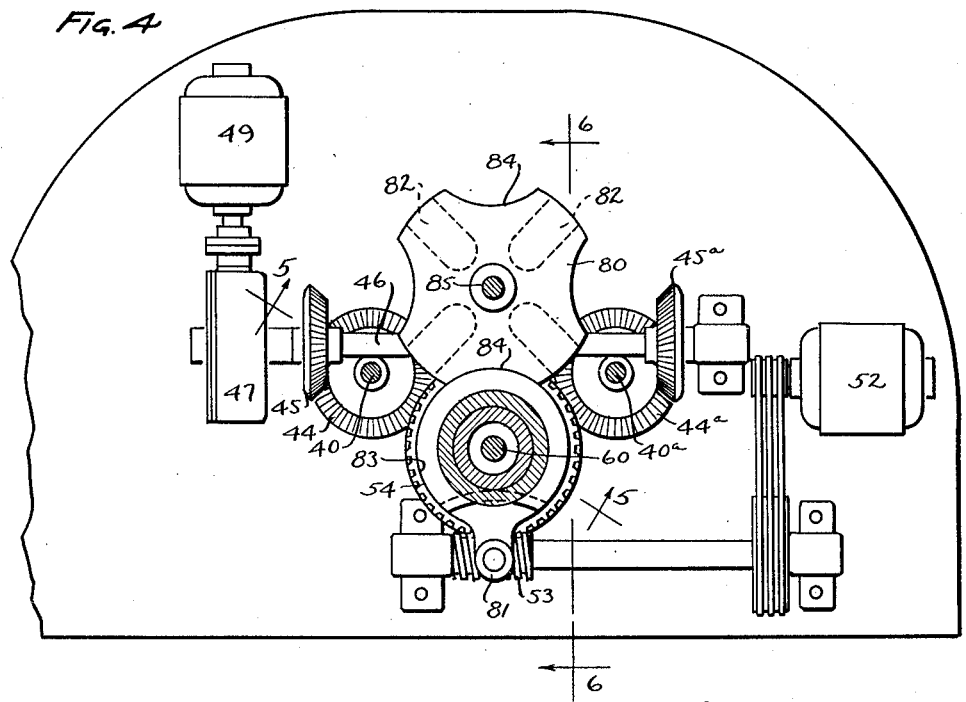
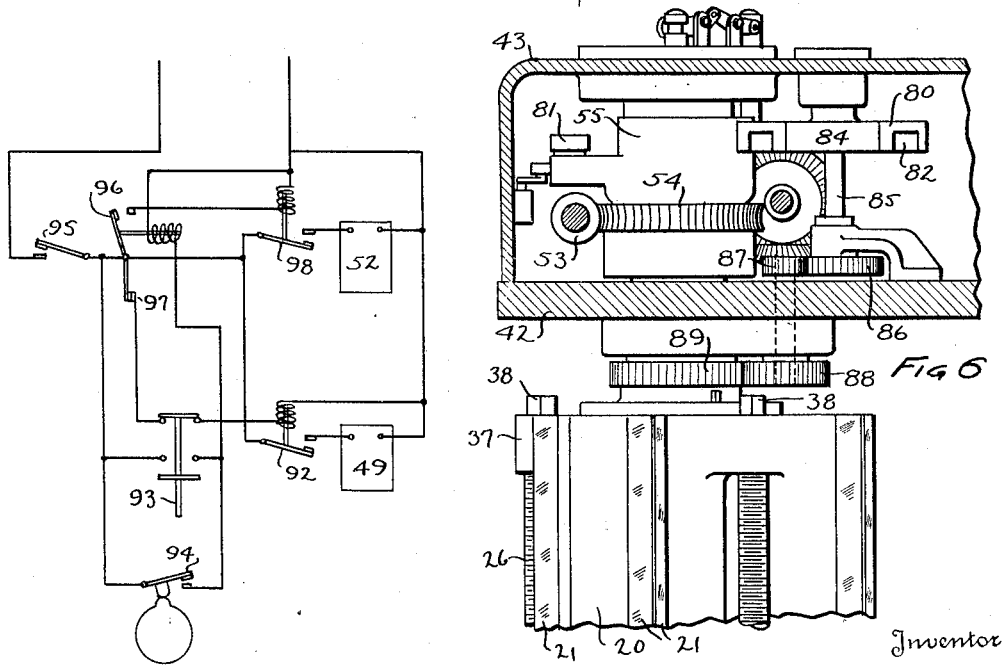
Inventor
Lyndon C. Cole
By Marechal & Noe
Attorney

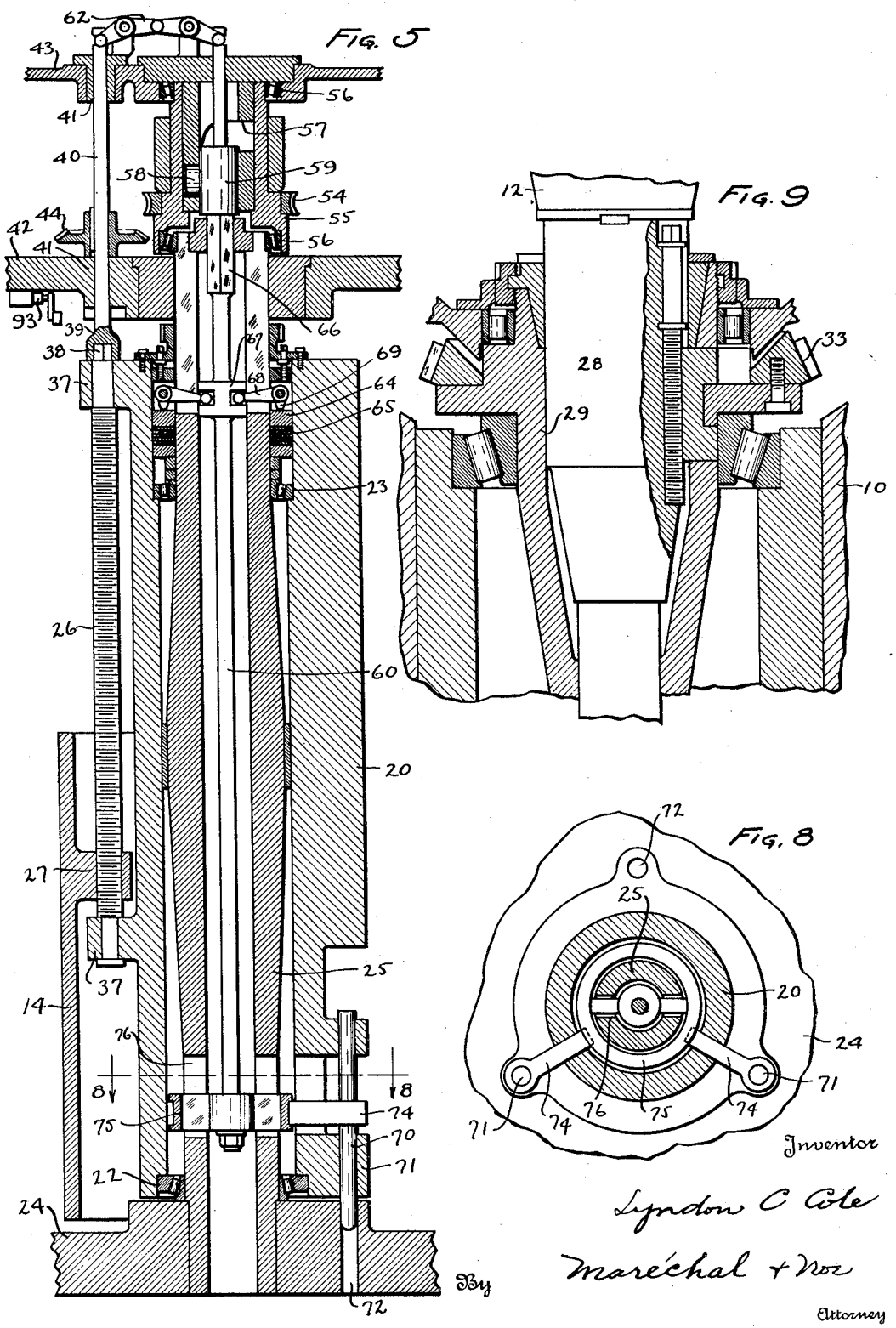

Patented May 29, 1934

1,960,896

UNITED STATES PATENT OFFICE 1,960,896

MACHINE TOOL

Lyndon C. Cole, Hamilton, Ohio, assignor to General Machinery Corporation, Hamilton, Ohio, a corporation of Delaware Application February 20, 1933, Serial No. 657,609

11 Claims. (Cl. 90—21)

This invention relates to machine tools, and more particularly to machine tools of the multiple station type.

The principal object of the invention is the provision of a machine tool having a plurality of stations in which the work is effectively operated on by the tools, the construction being such that the work is moved rectilinearly past the tools and rotationally from one cutting station to a succeeding cutting station.

Another object of the invention is the provision of a milling machine or the like embodying a rotatable support on which are reciprocably mounted a plurality of work holding carriages, the carriages being movable past the tool positions so that at one cutting operation the work travels in one direction but travels in the opposite direction at a succeeding cutting station for a second cutting operation on the work.

Another object of the invention is the provision of a machine tool such as a milling machine or the like having a plurality of cutting stations and having a loading and unloading station, means being provided for automatically feeding alternate carriages in opposite directions for effective cutting operations and automatically stopping the feeding movements of the carriages and then indexing the carriages rotationally to successive stations.

Other objects and advantages of the invention will be apparent from the following description, the appended claims and the accompanying drawings, in which,—

Fig. 1 is a front elevation of a machine tool embodying the present invention;

Fig. 2 is a top plan view thereof;

Fig. 3 is a horizontal section of a portion of the machine tool taken on the line 3—3 of Fig. 1;

Fig. 4 is a top plan view of the feeding and indexing mechanism the top cover wall of the machine being removed;

Fig. 5 is a vertical central section through the machine taken on the line 5—5 of Fig. 4;

Fig. 6 is a vertical section taken on the line 6—6 of Fig. 4;

Fig. 7 is a diagrammatic representation of the electrical connections;

Fig. 8 is a section on line 8—8 of Fig. 5; and

Fig. 9 is an enlarged sectional view through one of the cutter spindles.

In accordance with the present invention, each work holding carriage of a multiple station milling machine or the like is movable past the cutters of successive stations in different directions, the work being carried in one direction past the roughing cutters and in the opposite direction past the cutters which perform a second or finishing operation. The carriages may be arranged for radial movement on the surface of a rotatable table or be moved vertically on the sides of the table and the construction is preferably such that when they reach a loading station they are held stationary so the finished work can be readily removed and a new work piece mounted in place.

As herein shown, the machine tool comprises a frame 10 which is substantially arcuate in form as viewed in plan, the front side of the frame being open to provide a loading and unloading station. A plurality of rotatable work cutters such as the milling tools 12 are provided in the frame, six milling cutters being illustrated at the roughing up station A, see Fig. 3, arranged in two groups of three each, each group being adapted to machine three surfaces on a work piece. The work pieces are fixed to work supporting carriages herein shown as three in number, the carriage 14 shown in Fig. 3 being adapted to carry the work pieces 15 and 16 which are represented in the form of V-8 cylinder blocks of automobile engines. It will be apparent from inspection of Fig. 3 that as the carriage 14 is moved vertically the work pieces 15 and 16 are moved past the several milling tools 12 and the several surfaces of the work pieces are brought into engagement with the milling tools are thus machined all at the same time.

The several work supporting carriages 14, 17 and 18 are mounted for vertical reciprocatory movement on the sides of the carriage supporting drum 20, suitable guide means 21 being provided on the adjacent sides of the drum and carriages. The drum itself is rotatably mounted, for indexing operations, about a central axis which is preferably although not necessarily arranged substantially vertically. As shown in Fig. 5 the drum 20 is rotatably supported by means of the bearings 22 and 23 on the base portion 24 of the frame and on a fixed vertical standard 25, respectively. By means of suitable indexing mechanism, the carriage 18, see Fig. 3, may be moved from the loading and unloading position indicated, to the roughing up station or position A, this movement being obtained by rotationally moving the drum through 120° and then holding the drum stationary. A subsequent indexing operation moves the drum from the station A to a finishing station B, and after the finishing cut provided for at station B the drum is again indexed to bring the carriage back to the position shown in the figure referred to.

110

When any carriage is in the loading and unloading position, it is in its lowermost position on the drum and is maintained stationary while the cylinder blocks or other work to be machined is fastened in place thereon. After the carriage is moved to the roughing up position A, the feed screw 26 is rotated, this screw being in threaded engagement with a lug 27 on the carriage so that the rotation of the screw at a substantially constant speed causes the carriage to move vertically from its lowest position up to its highest position, bringing the work past the cutters for an effective preliminary or roughing cutting operation. When the carriage reaches its uppermost position at station A, and the work has been moved entirely past the cutters 12, the drum 20 is rotatably indexed, bringing the work to the station B. The feed screw 26 is then rotated in an opposite direction, causing the carriage to move down, or in the relatively opposite direction to which it was moved during the roughing cut. This brings the work down past the cutters of station B and produces a finishing cut. When the work and carriage are at their lowermost position the drum is again indexed, clockwise as viewed in Fig. 3, so that the carriage is thus moved to the loading and unloading station where the machined work can be removed and other work pieces fixed to the carriage. It will be understood that as each carriage comes around with the finished work to the loading and unloading station the work is removed and other work pieces attached during the time the cutters at station A are taking a roughing cut on the work pieces at that station as they move upwardly, the finishing cutters at station B at the same time taking finishing cuts on the work pieces at that station as those work pieces move downwardly. As herein shown the machine tool is provided with only three stations, one for unloading and loading the work and the other two for effective cutting operations, but it will be apparent that additional stations can be provided for additional cutting operations if desired.

The milling cutters 12 are provided on operating spindles 28 suitably secured to sleeves 29, the central sleeve of each group of three spindles being driven by a worm gear 30, see Fig. 3, operated through suitable change speed gearing provided in the gear box 31, and driven by a motor 32. On the central spindle 29 is fixed a spiral bevel gear 33, see Fig. 3, which meshes with spiral bevel gears 34 and 35 fixed to the adjacent two spindles so that the three spindles are all rotated at the same speed.

As previously mentioned each of the work supporting carriages is in threaded engagement with a feed screw 26, which is rotatably supported in bearing brackets 37 provided on the drum 20. At the upper end of each feed screw is a non-circular stub clutch projection 38 which is adapted to be engaged by the clutch socket 39 provided at the lower end of an operating shaft 40. The shaft 40 is vertically movable in spaced bearings 41 provided in the wall 42 of the frame and in the cover portion 43, which encloses the feeding and indexing apparatus. Splined on the shaft 40 is a hypoid bevel gear 44 driven by gear 45 on a shaft 46. The shaft 46 is operated through worm and worm gear or other gearing in the gear casing 47, and driven by the feed motor 49. The shaft 46 is extended and supports a second gear 45a meshing with a second hypoid gear 44a which is splined to a second operating shaft 40a engageable with the feed screw 26 at station B. When the feed motor 49 is operating it will be apparent that the two operating shafts 40 and 40a at stations A and B respectively are rotated in opposite directions so as to operate the two feed screws oppositely at stations A and B, causing the carriage at station A to be moved upwardly while the carriage at station B moves downwardly.

At the end of the upward movement of the carriage at station A, and at the end of the downward movement of the carriage at station B, the feed motor 49 is deenergized and the indexing motor 52 is started. Motor 52 as shown in Fig. 4 drives a worm 53 meshing with worm gear 54 which is fixed to a rotatable block 55 supported by means of antifriction bearings 56. The block 55 is provided with an internal cam groove 57 cooperating with a cam roll 58 which projects from and is carried by a block 59 fixed adjacent the upper end of a non-rotatable but axially movable central rod 60. The cam groove 57 is of such form as to produce a vertical movement of rod 60 during the first part of a complete revolution of block 55. When the rod 60 is thus moved upwardly, the double ended links 62, see Figs. 2 and 5, are moved so as to draw the two operating feed shafts 40 and 40a upwardly thus disengaging the feed drive from the feed screws 26. The same upward movement of the rod 60 also releases a friction disk brake 64 embodying friction disks 65 some non-rotatably mounted on the fixed standard 25 and others non-rotatably mounted on the drum 20. The rod 60 which is held against rotation by a square shank portion 66, is provided with a collar 67 adapted to operate the two levers 68 which are fixed to the cams 69 serving in the position shown in Fig. 5 to hold the friction disks securely together and thus maintaining a fixed position of the carriage supporting drum after an indexing operation has been completed.

A positive lock for accurately holding the drum in its proper position with respect to the cutting stations is also provided, embodying two lock pins 70 vertically movable in bearing portions 71 provided in the lower end of the drum, and adapted for engagement at their lower ends in sockets 72 provided in the base portion 24 of the main frame. Three of such sockets are provided spaced 120° apart and adapted to receive the two holding or lock pins 70 when the rod 60 is depressed to the position shown in Fig. 5. The lock pins are supported by arms 74 which are rotatably mounted on a member 75 fixed to the lower end of the rod 60 and projecting through slots 76 in the fixed spindle 25.

When the indexing motor 52 is energized the block 55 during the first part of a complete revolution thus unlocks the drum, releases the friction brake and also disengages the feed shafts 40 and 40a from the feed screws 26. Further rotational movement of the block 55 causes the comparatively rapid rotation of the Geneva wheel 80, the block 55 having a roller 81 which is brought into engagement with slots 82 in the Geneva wheel so that about 90° movement of the block 55 causes a 45° movement of the Geneva wheel 80, further movement of the block 55 bringing its cylindrical surface 83 into engagement with one of the four cylindrical recesses 84 of the Geneva wheel 80 thus holding the Geneva wheel fixed. A complete revolution of the block 55, therefore, causes a part revolution of the Geneva wheel 80 after unlocking the drum and releasing the feed screws. This part revolution of the Geneva wheel 80 operates a shaft 85 on which is a gear 86 which drives through gears 87 and 88, operating a gear 89 fixed on the upper end of the drum 20. The number of teeth and the gear diameters are such that 90° movement of the Geneva wheel 80 produces 120° rotational movement of the drum 20, thus moving the several carriages to their successive stations and then holding the drum 20 in a fixed position.

The starting and stopping of the feed motor 49 and of the indexing motor 52 is accomplished automatically. The feed motor 49 is energized through relay switch 97, limit switch 93 and relay 92 when the line switch 95 is closed. After the carriage has reached a predetermined height near the upper end of its movement at station A, see Figs. 5 and 7, it operates limit switch 93 de-energizing relay 92, closing switch 96 and opening 97. This energizes relay 98 and the indexing motor starts. The roller 81 moves from an initial position and in so doing closes switch 94 which parallels the make contact of limit switch 93. Starting the indexing motor also moves the carriage from under limit switch 93 allowing it to return to its original position shown in Fig. 7. Switch 94 having closed keeps relay contact 96 closed and 97 open, therefore preventing energization of relay 92 until after the indexing limit switch roller 85 has made a complete revolution. When this has occurred, 97 closes and 96 opens so that relay 92 is again energized and 98 deenergized. This starts the feed motor and stops the indexing motor.

In accordance with the present invention, the work may be moved rectilinearly, successive movements of the work in opposite directions being utilized for successive cutting operations, without entailing the loss of time required in an idling return movement. No time is lost during the loading and unloading operations, as the roughing up and finishing cuts are being made on work in the machine while the operator is unloading the finished work pieces and loading additional pieces on the carriage at the loading station. The drive for the carriages is quite simple, because the carriage does not require a rapid return speed, but on the contrary moves either upwardly or downwardly at the same feeding speed. In conventional milling cutters the work piece after being passed under the milling cutter must be removed and the table traversed back empty in order that the cutting tools will not scratch the work during such return movement, but in accordance with the present invention all of the movements of the work past the cutting tools are fully utilized in cutting operations, thus saving considerable time and greatly facilitating the operations.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a multiple station machine tool of the character described, a frame, cutting tools rotatably mounted in said frame, operating means for said cutting tools, a plurality of work supporting carriages, means for moving said carriages about a fixed axis for indexing from one station to another, and means for moving said carriages rectilinearly at a plurality of stations past said cutters for cutting operations, said moving means having provision for rectilinearly moving a carriage in relatively opposite directions at successive cutting stations.

2. In a multiple station machine tool of the character described, a frame, cutters rotatably mounted on said frame and provided at a plurality of cutting stations for successive engagement with a work piece, operating means for said cutters, a plurality of relatively movable work supporting carriages, means for moving said carriages about a fixed axis from a loading station to successive cutting stations, and means for rectilinearly moving a carriage in relatively opposite directions at successive cutting stations for effective cutting operations on the work piece.

3. In a multiple station machine tool of the character described, a frame, cutters rotatably mounted in said frame at a plurality of cutting stations, operating means for said cutters, a plurality of work supporting carriages, a rotatable carriage support on which said carriages are mounted for rectilinear movement, means for moving said carriages on said carriage support so that a carriage moves past a cutter at one station in one direction for an initial cutting action while another carriage moves in the opposite direction past a cutter at another station for a succeeding cutting action, and means for rotating said carriage support to bring the various carriages to successive stations.

4. In a multiple station milling tool of the character described, a frame, a rotatable carriage support, work supporting carriages mounted for reciprocating movement on said support, said frame and support providing a loading station and a plurality of cutting stations, cutters provided in said frame at said cutting stations, means for moving said support rotationally step by step for indexing the carriages from one station to a succeeding station, and means for moving adjacent carriages in relatively opposite directions for effective cutting operations at said successive stations.

5. In a multiple station machine tool of the character described, a frame, a rotatable carriage support, work supporting carriages reciprocably mounted on the sides of said support for movement along lines parallel to the support axis, cutters provided on said frame at a plurality of cutting stations, means for indexing said support on its axis to bring the carriages to successive stations, means for moving said carriages on said support, and means for holding said support stationary during movements of the carriages thereon.

6. In a multiple station machine tool of the character described comprising a frame, a rotatable carriage support, work supporting carriages mounted for reciprocating movement on said support, cutters provided on said frame at a plurality of cutting stations, means for indexing said support about its axis, and means for moving a carriage only at the cutting stations, said last means producing movement of a carriage in a single direction at one station and in an opposite direction at a successive cutting station.

7. A multiple station machine tool of the character described comprising a substantially arcuate frame having one open side and providing a loading station at said open side, a drum rotatably mounted within said frame, carriages slidably mounted on the sides of said drum, a feed member for each carriage, cutters provided at a plurality of cutting stations on said frame, and means for operating the said feed members when the carriages are at the cutting stations to provide for relatively opposite movement of the adjacent carriages at said cutting stations for effective cutting engagement of the work with the cutters at successive cutting stations.

8. A multiple station machine tool of the character described comprising a frame, a drum rotatably mounted in said frame, work supporting carriages reciprocably mounted on said drum, cutters provided on said frame for effective engagement with the work at a plurality of cutting stations, means for indexing said drum rotationally and for holding the drum stationary at the end of an indexing movement, means for moving the carriages along said drum when the drum is stationary at a cutting station, and a disabling device for automatically rendering one of said means ineffective when the other of said means is effective.

9. A multiple station machine tool of the character described comprising a frame, a drum rotatably mounted in said frame, work supporting carriages mounted for rectilinear movement on said drum, cutters provided on said frame at a plurality of cutting stations, means for rotatably indexing said drum, feed screws for said carriages, operating shafts engageable with said feed screws at the cutting stations, and means for engaging and disengaging said operating shafts and feed screws automatically at the ends of indexing operations.

10. A multiple station machine tool of the character described comprising a frame, a drum rotatably mounted in said frame on a substantially vertical axis, work supporting carriages mounted for rectilinear movement on said drum, cutters provided on said frame at a plurality of cutting stations, means for rotatably indexing said drum, feed screws for said carriages, operating shafts engageable with said feed screws at the cutting stations, and means for moving said shafts in relatively opposite directions at adjacent cutting stations.

11. In a multiple station milling machine, a frame, milling cutters rotatably mounted in said frame at a plurality of cutting stations, operating means for said milling cutters, a plurality of work supporting carriages, a rotatable drum on which said carriages are vertically movable, means for feeding said carriages on said drum so that a carriage at one cutting station moves in a single direction and when at the succeeding cutting station moves in an opposite direction for effective cutting operations, means for disengaging said feed means when a carriage is at one station for loading and unloading operations, and means for rotatably moving said drum for indexing.

LYNDON C. COLE.